(12) United States Patent
Itoh et al.

(10) Patent No.: US 9,713,846 B2
(45) Date of Patent: Jul. 25, 2017

(54) 3-BLADE DRILL

(75) Inventors: Kazutoyo Itoh, Toyokawa (JP);
Kazuteru Takai, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 273 days.

(21) Appl. No.: 14/395,877

(22) PCT Filed: May 30, 2012

(86) PCT No.: PCT/JP2012/063952
§ 371 (c)(1),
(2), (4) Date: Oct. 21, 2014

(87) PCT Pub. No.: WO2013/179417
PCT Pub. Date: Dec. 5, 2013

(65) Prior Publication Data
US 2015/0104265 A1 Apr. 16, 2015

(51) Int. Cl.
*B23B 51/02* (2006.01)
(52) U.S. Cl.
CPC ........ *B23B 51/02* (2013.01); *B23B 2251/082* (2013.01); *B23B 2251/14* (2013.01); *B23B 2251/202* (2013.01); *Y10T 408/9097* (2015.01)
(58) Field of Classification Search
CPC .......... B23B 2251/082; B23B 2251/14; B23B 2251/202; Y10T 408/9097
See application file for complete search history.

(56) References Cited

U.S. PATENT DOCUMENTS 5,807,041 A 9/1998 Lindblom
6,071,046 A * 6/2000 Hecht ..................... B23B 51/02
408/224

(Continued)

FOREIGN PATENT DOCUMENTS

| CN | 1216944 A | 5/1999 | | |
|---|---|---|---|---|
| CN | 1396030 A | 2/2003 | | |
| CN | 1575216 A | 2/2005 | | |
| CN | 2719460 Y | 8/2005 | | |
| CN | 102170989 A | 8/2011 | | |
| DE | 3709647 A1 | * 10/1988 | ............ | B23B 51/02 |
| DE | 102008049509 A1 | * 3/2010 | ............ | B23B 51/02 |

(Continued)

OTHER PUBLICATIONS

Dec. 3, 2015 Office Action issued in Chinese Patent Application No. 201280073558.1.

(Continued)

*Primary Examiner* — Eric A Gates
(74) *Attorney, Agent, or Firm* — Oliff PLC

(57) ABSTRACT

A three-flute drill includes: three chip discharge flutes; and three cutting edges each having concavely-curved and convexly-curved cutting edge portions, an axially perpendicular cross-sectional view orthogonal to an axial center having first convex and concave curves respectively corresponding to the convexly-curved and concavely-curved cutting edge portions intersecting each other, in the axially perpendicular cross-sectional view, a concave amount of the first concave curve being within a range of 0.01D to 0.05D in terms of a drill cutting diameter relative to a reference line connecting an outer circumferential point, at which a drill outer circumferential portion intersects with the first convex curve, and the axial center, and in the axially perpendicular cross-sectional view, a rake chamfer width being a distance from an intersection between a straight line through the intersection and orthogonal to the reference line and the reference line, to the outer circumferential point, and being within 0.005D to 0.06D.

7 Claims, 11 Drawing Sheets

(56) References Cited

U.S. PATENT DOCUMENTS

| | | | |
|---|---|---|---|
| 6,315,504 B1* | 11/2001 | Sekiguchi | B23B 51/02 407/63 |
| 6,916,139 B2* | 7/2005 | Yanagida | B23B 51/02 408/227 |
| 6,923,602 B2* | 8/2005 | Osawa | B23B 51/02 408/230 |
| 8,449,227 B2* | 5/2013 | Danielsson | B23B 51/02 408/226 |
| 8,834,080 B2* | 9/2014 | Kauper | B23B 51/02 408/224 |
| 9,352,399 B2* | 5/2016 | Yanagida | B23B 51/00 |
| 2003/0039522 A1 | 2/2003 | Yanagida et al. | |
| 2003/0103820 A1 | 6/2003 | Frejd | |
| 2011/0081215 A1* | 4/2011 | Nakamura | B23B 51/02 408/230 |
| 2011/0170974 A1 | 7/2011 | Masuda | |
| 2012/0003054 A1* | 1/2012 | Takagi | B23G 5/20 408/1 R |

FOREIGN PATENT DOCUMENTS

| | | | |
|---|---|---|---|
| EP | 1 275 458 A1 | 1/2003 | |
| EP | 2754518 A1 | 7/2014 | |
| FR | 2793176 A1 * | 11/2000 | B23B 51/02 |
| JP | A-63-278708 | 11/1988 | |
| JP | A-2003-25125 | 1/2003 | |
| WO | WO 2005030418 A1 * | 4/2005 | B23B 51/02 |
| WO | WO 2010/038279 A1 | 4/2010 | |
| WO | WO 2010095249 A1 * | 8/2010 | B23B 51/08 |
| WO | 2012/053090 A1 | 4/2012 | |

OTHER PUBLICATIONS

Jan. 4, 2016 Extended Search Report issued in European Patent Application No. 12878195.2.

International Search Report issued in International Patent Application No. PCT/JP2012/063952 dated Aug. 28, 2012.

* cited by examiner

| WORK MATERIAL | | | | | | | | | | | | | | | | |
|---|---|---|---|---|---|---|---|---|---|---|---|---|---|---|---|---|
| LOW CARBON STEEL | MEDIUM CARBON STEEL | HIGH CARBON STEEL | ALLOY STEEL | HEAT TREATED STEEL | HARDENED STEEL | | | | STAINLESS STEEL | TOOL STEEL | CAST IRON | DUCTILE CAST IRON | STEEL ALLOY | ALUMINUM EXTENSION MATERIAL | ALUMINUM ALLOY CASTING | TITANIUM | TITANIUM ALLOY | INCONEL |
| C~0.25% | C0.25~0.45% | C0.45%~ | SCM | ~35 HRC | 35~45 HRC | 45~50 HRC | 50~62 HRC | 62~70 HRC | SUS | SKD SKS | FC | FCD | Cu | AL | AC | Ti | | |
| ◎ | ◎ | ◎ | ◎ | ◎ | ○ | ○ | | | ○ | | ◎ | ◎ | | | | | ○ | ○ |

| | SHAPE OF CUTTING EDGE | SHAPE OF AXIAL PERPENDICULAR FLUTE CROSS SECTION | | | |
|---|---|---|---|---|---|
| | | R1 | R2 | R3 | R4 |
| INVENTIVE PRODUCT | HOOKED CUTTING EDGE | 0.13D | 0.28D | 0.23D | 0.62D |
| COMPARISON PRODUCT | STRAIGHT CUTTING EDGE | — | 1.45D | 0.39D | 0.46D |

NUMBER OF MACHINED HOLES

FIG.11
FIG.12
PRIOR ART
FIG.13
| | SHAPE OF AXIAL PERPENDICULAR FLUTE CROSS SECTION | | | | |
|---|---|---|---|---|---|
| | R1(mm) | R2(mm) | INTERSECTION A | LF | LW |
| INVENTIVE PRODUCT | 1.00(0.125D) | 2.00(0.25D) | INTERSECTING | 0.02D | 0.04D |
| COMPARISON PRODUCT | 1.00(0.125D) | 2.00(0.25D) | CIRCUMSCRIBED CIRCLE | 0.003D | 0.10D |

NUMBER OF MACHINED HOLES

FIG.19

| No. | SHAPE OF AXIAL PERPENDICULAR FLUTE CROSS SECTION | | | | | | | |
|---|---|---|---|---|---|---|---|---|
| | R1 | R2 | R3 | R4 | R3/R2 | WEB THICKNESS CD | LF | LW |
| 1 | 0.13D | 0.26D | 0.21D | 0.50D | 0.81 | 0.33D | 0.02D | 0.04D |
| 2 | 0.13D | 0.26D | 0.14D | 0.50D | 0.54 | 0.33D | 0.02D | 0.04D |
| 3 | 0.13D | 0.26D | 0.28D | 0.50D | 1.08 | 0.33D | 0.02D | 0.04D |
| 4 | 0.13D | 0.26D | 0.11D | 0.50D | 0.42 | 0.33D | 0.02D | 0.04D |
| 5 | 0.13D | 0.26D | 0.30D | 0.50D | 1.15 | 0.33D | 0.02D | 0.04D |
| 6 | 0.018D | 0.26D | 0.21D | 0.50D | 0.81 | 0.33D | 0.02D | 0.003D |
| 7 | 0.13D | 0.13D | 0.21D | 0.50D | 1.62 | 0.33D | 0.06D | 0.04D |
| 8 | 0.42D | 0.26D | 0.21D | 0.50D | 0.81 | 0.33D | 0.02D | 0.04D |
| 9 | 0.13D | 0.52D | 0.21D | 0.50D | 0.4 | 0.33D | -0.01D | 0.09D |
| 10 | 0.13D | 0.26D | 0.25D | 0.50D | 0.96 | 0.13D | 0.04D | 0.04D |
| 11 | 0.13D | 0.26D | 0.25D | 0.50D | 0.96 | 0.52D | -0.01D | 0.04D |
| 12 | 0.38D | 0.09D | 0.21D | 0.50D | 2.33 | 0.33D | 0.06D | 0.12D |

FIG.20

| No. | CUTTING TEST RESULT | | |
|---|---|---|---|
| | CHIP SHAPE | THRUST LOAD | DURABILITY PERFORMANCE |
| 1 | ○ | ○ | ○ |
| 2 | ○ | ○ | ○ |
| 3 | ○ | ○ | ○ |
| 4 | △ | △ | ×: BREAKAGE DUE TO CLOGGING OF CHIPS |
| 5 | △ | △ | ×: BREAKAGE DUE TO RIGIDITY SHORTAGE |
| 6 | ○ | △ | △: CORNER PORTION CRACK |
| 7 | △ | △ | △: CORNER PORTION CRACK |
| 8 | ○ | △ | △: CORNER PORTION CRACK |
| 9 | × | × | △: SIGNIFICANT WEAR |
| 10 | ○ | △ | ×: BREAKAGE DUE TO RIGIDITY SHORTAGE |
| 11 | △ | × | ×: BREAKAGE DUE TO CLOGGING OF CHIPS |
| 12 | △ | × | △: CORNER PORTION CRACK |

… # 3-BLADE DRILL

TECHNICAL FIELD

The present invention relates to a three-flute drill and particularly to a technique of suppressing clogging of chips and further improving a tool life by causing chips to be curled and broken into pieces with a short shape.

BACKGROUND ART

A drill frequently used as a drilling tool is disposed with a cutting edge at an axial tip and a chip discharge flute in the axial direction and is rotated around an axial center to perform cutting with the cutting edge at the tip while discharging chips through the chip discharge flute. A three-flute drill disposed with three chip discharge flutes and three cutting edges at a tip is proposed as one type of such a drill. A drill described in Patent Document 1 is an example thereof and is disposed with a convexly-curved cutting edge portion formed into a convexly-curved shape convexed in the drill rotation direction on an outer circumferential end side of a cutting edge as well as a concavely-curved cutting edge portion formed into a concavely-curved shape concaved in the direction opposite to the drill rotation direction on an inner circumferential side of the convexly-curved cutting edge portion, and the convexly-curved cutting edge portion and the concavely-curved cutting edge portion are smoothly connected. In such a drill, an obtuse intersection angle is made between the cutting edge and a margin portion on an outer circumference of a drill main body, increasing the strength to suppress occurrence of cracking and chipping, and since the chips cut by the cutting edge are not broken at inner/outer circumferences of the cutting edge and the chips are curled and rolled into the inner circumferential side by the convexly-curved cutting edge portion, the chips are smoothly discharged and the tool durability is enhanced.

PRIOR ART DOCUMENT

Patent Document

Patent Document 1: WO2010/038279

SUMMARY OF THE INVENTION

Problem to be Solved by the Invention

However, although the conventional three-flute drill as described above curls chips generated by the cutting edges, since the chips include those having a longer overall length with a needle-like projection like chips generated by straight cutting edges at a high proportion, the discharge property of chips is still insufficient and cracking and chipping occur in the drill in the course of repeating the cutting, resulting in a problem of the durability of the drill considered not necessarily sufficient. Particularly, since the three-flute drill has a flute width and a cross-sectional area of a chip discharge flute smaller than a two-flute drill, clogging of chips easily occurs and the problem described above becomes particularly prominent.

The present invention was conceived in view of the situations and it is therefore an object of the present invention to cause chips to be curled and broken into pieces with a short shape in a three-flute drill so as to suppress clogging of chips and further improve a tool life.

Means for Solving the Problem

To achieve the object, the first aspect of the invention provides a three-flute drill comprising: (a) three chip discharge flutes axially disposed to open in a tip portion; and (b) three cutting edges each formed at an intersecting portion between an inner wall surface of each of the chip discharge flutes facing in a drill rotation direction during hole drilling and a tip flank formed on the tip portion, (c) the cutting edge having a concavely-curved cutting edge portion in a concavely-curved shape formed on an inner circumferential side and a convexly-curved cutting edge portion in a convexly-curved shape formed on an outer circumferential side, (d) an axial perpendicular cross section orthogonal to an axial center O having a first convex curve corresponding to the convexly-curved cutting edge portion and a first concave curve corresponding to the concavely-curved cutting edge portion intersecting with each other at an intersection A.

The second aspect of the invention provides the three-flute drill recited in the first aspect of the invention, wherein in the axial perpendicular cross section, a concave amount LF of the first concave curve is within a range of 0.01D to 0.05D in terms of a drill cutting diameter D relative to a reference line K connecting an outer circumferential point B, at which a drill outer circumferential portion intersects with the first convex curve, and the axial center O. The concave amount LF is a separation distance of a portion of the first concave curve most distant from the reference line K. "To" between numerical values means a numerical value range including both the lower limit value and the upper limit value.

The third aspect of the invention provides the three-flute drill recited in the second aspect of the invention, wherein in the axial perpendicular cross section, a rake chamfer width LW is a distance from an intersection E between a straight line passing through the intersection A and orthogonal to the reference line K and the reference line K, to the outer circumferential point B, and is within a range of 0.005D to 0.06D in terms of the drill cutting diameter D.

The fourth aspect of the invention provides the three-flute drill recited in the second or third aspect of the invention, wherein in the axial perpendicular cross section, a rake angle θ is an angle between the reference line K and the first convex curve at the outer circumferential point B and is negative.

The fifth aspect of the invention provides the three-flute drill recited in any one of the first to fourth aspects of the invention, wherein the three-flute drill has a web thickness CD within a range of 0.15D to 0.50D in terms of the drill cutting diameter D.

The sixth aspect of the invention provides the three-flute drill recited in any one of the first to fifth aspects of the invention, wherein in the axial perpendicular cross section, an inner wall surface of the chip discharge flute facing opposite to the drill rotation direction during hole drilling is made up of a second concave curve formed on the inner circumferential side and a second convex curve formed continuously from the second concave curve on the outer circumferential side, and wherein the second convex curve reaches a heel.

The seventh aspect of the invention provides the three-flute drill recited in the sixth aspect of the invention, wherein when the three-flute drill has the first convex curve with a curvature radius of R1, the first concave curve with a curvature radius of R2, the second concave curve with a curvature radius of R3, and the second convex curve with a curvature radius of R4 in the axial perpendicular cross section, the curvature radii R1 to R4 are within ranges of the following equations (1) to (4), respectively, in terms of the drill cutting diameter D:

$$R1: 0.02D \text{ to } 0.4D \quad (1);$$

$$R2: 0.10D \text{ to } 0.45D \quad (2);$$

$$R3: 0.10D \text{ to } 0.45D \quad (3); \text{ and}$$

$$R4: 0.3D \text{ to } 1.2D \quad (4).$$

The eighth aspect of the invention provides the three-flute drill recited in the seventh aspect of the invention, wherein a relationship between the curvature radius R2 of the first concave curve and the curvature radius R3 of the second concave curve satisfies the following equation (5):

$$0.5 \leq R3/R2 \leq 1.1 \quad (5).$$

Effects of the Invention

According to the three-flute drill as described above, since each of the three cutting edges at the tip has the concavely-curved cutting edge portion on the inner circumferential side and the convexly-curved cutting edge portion on the outer circumferential side and the axial perpendicular cross section orthogonal to the axial center O of the drill has the first convex curve corresponding to the convexly-curved cutting edge portion and the first concave curve corresponding to the concavely-curved cutting edge portion intersecting with each other at the intersection A, the range of the first convex curve, i.e., the convexly-curved cutting edge portion, can be made smaller and the first concave curve, i.e., the concavely-curved cutting edge portion, can be expanded and disposed on the outer circumferential side, and the concave amount of the first concave curve can be made larger. As a result, since chips generated from the cutting edge are properly curled and easily broken in the first concave curve portion of the chip discharge flute and are formed into a relatively short curled shape having no needle-like projection and, therefore, the chips are smoothly discharged with enhanced discharge performance, the clogging of the chips is suppressed and the tool life is further improved even in the three-flute drill having relatively smaller flute width and cross-sectional area of the chip discharge flutes.

In the second aspect of the invention, since a concave amount LF of the first concave curve is within a range of 0.01D to 0.05D relative to a reference line K connecting an outer circumferential point B of the first convex curve and the axial center O, the chips are properly curled and broken into pieces having a curled shape with a relatively shorter overall length and are further smoothly discharged to suppress the clogging of the chips, and the durability performance is enhanced while the thrust load during hole drilling is reduced. If the concave amount LF of the first concave curve becomes less than 0.01D, the flank wear width increases and the durability performance deteriorates and, if the concave amount LF exceeds 0.05D, the outer circumferential corner portion of the cutting edge easily cracks.

In the third aspect of the invention, since the axially perpendicular cross section has the rake chamfer width LW within a range of 0.005D to 0.06D, the chips are properly curled and easily broken in the first concave curve portion into pieces having a curled shape with a relatively shorter overall length and are further smoothly discharged to suppress the clogging of the chips, and the durability performance is enhanced while the thrust load during hole drilling is reduced. If the rake chamfer width LW becomes less than 0.005D, the outer circumferential corner portion of the cutting edges easily cracks and, if the rake chamfer width LW exceeds 0.06D, the flank wear width increases and the durability performance deteriorates.

In the fourth aspect of the invention, since the rake angle θ at the outer circumferential point B is negative, the outer circumferential corner portion of the cutting edge corresponding to the outer circumferential point B is enhanced in strength and prevented from cracking, and the durability performance of the drill is enhanced.

In the fifth aspect of the invention, since the drill has the web thickness CD within a range of 0.15D to 0.50D, the chip discharge performance and the transverse strength of the drill are properly secured and the durability performance of the drill is further enhanced. If the web thickness CD becomes less than 0.15D, the transverse strength is reduced and the drill is easily broken and, if exceeding 0.50D, the chip discharge performance deteriorates and the drill is easily broken due to clogging of chips.

In the sixth aspect of the invention, since the inner wall surface facing opposite to the drill rotation direction in the axial perpendicular cross section is made up of the second concave curve on the inner circumferential side and the second convex curve on the outer circumferential side, chips are smoothly discharged through the chip discharge flute to suppress the clogging of chips, and the durability performance is enhanced while the thrust load during hole drilling is reduced. Because of the second convex curve reaching the heel, and also because of the first convex curve on the leading edge side, the opening end edges of the C-shaped or U-shaped cross section of the chip discharge flute, i.e., the corner portions making up the leading edge and the heel are reinforced by the first convex curve and the second convex curve, respectively, to prevent the corner portions from cracking and enhance the durability of the drill.

In the seventh aspect of the invention, when the drill has the first convex curve with the curvature radius of R1, the first concave curve with the curvature radius of R2, the second concave curve with the curvature radius of R3, and the second convex curve with the curvature radius of R4, since the curvature radii R1, R2, R3, and R4 are within the ranges of 0.02D to 0.4D, 0.10D to 0.45D, 0.10D to 0.45D, and 0.3D to 1.2D, respectively, the chips are properly curled and broken into pieces having a curled shape with a relatively shorter overall length and are smoothly discharged through the chip discharge flute to suppress the clogging of chips, and the durability performance is enhanced while the thrust load during hole drilling is reduced.

In the eighth aspect of the invention, since the drill has the radius ratio R3/R2 of the curvature radius R3 to R2 within a range of 0.5 to 1.1, the cross-sectional area of the chip discharge flute can be made larger within a range in which the rigidity of the drill is ensured, so as to improve the chip discharge performance. If the radius ratio R3/R2 becomes less than 0.5, the cross-sectional area of the chip discharge flute becomes too small and the clogging of chips easily occurs and, if exceeding 1.1, the rigidity of the drill is reduced, and the drill is easily broken.

BRIEF DESCRIPTION OF THE DRAWINGS

FIG. 11 is a photograph of a chip shape generated in the hole drilling using the inventive product in the cutting test 1.

FIG. 12 is a photograph of a chip shape generated in the hole drilling using the comparison product in the cutting test 1.

FIG. 13 is a diagram of dimensions of portions of flute cross-sectional shapes of an inventive product and a comparison product used in a cutting test 2 for comparison.

FIG. 19 is a diagram of dimensions of portions of flute cross-sectional shapes of twelve types of test products No. 1 to No. 12 used in a cutting test 3 for comparison.

FIG. 20 is a diagram for explaining a test result of the cutting test 3.

MODE FOR CARRYING OUT THE INVENTION

Figure 1:
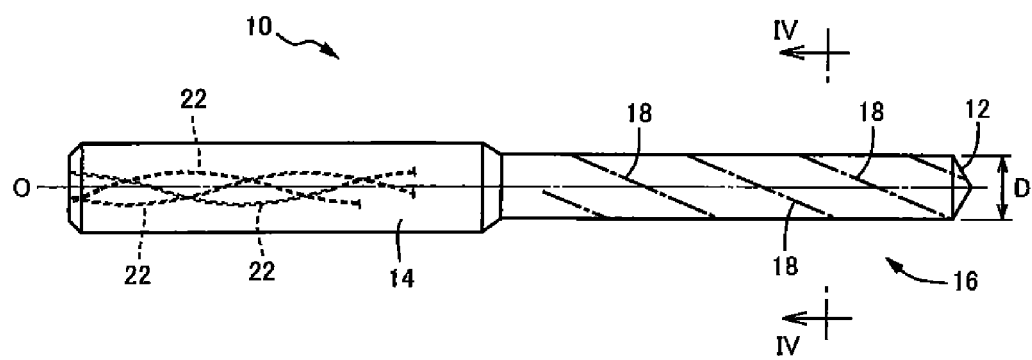
FIG. 1 is a conceptual front view of a three-flute drill that is an example of the present invention, the view seen from a direction perpendicular to an axial center O.

Three chip discharge flutes are disposed at regular angular intervals (at intervals of 120 degrees) around an axial center O and are suitably helical flutes twisted at a predetermined helix angle around the axial center O. The helix angle of the chip discharge flutes is desirably within a range of about 10 to 50 degrees, for example. A cutting edge has a convexly-curved cutting edge portion on the outer circumferential side and a concavely-curved cutting edge portion on the inner circumferential side, and an axial-center-side cutting edge portion is disposed by thinning such as R-type thinning on the inner circumferential side relative to the concavely-curved cutting edge portion, i.e., in a web thickness portion.

The three-flute drill of the present invention is made of hard tool material such as cemented carbide and high-speed tool steel, for example, and a flute portion disposed with the chip discharge flute including an inner wall surface of the flute and a drill outer circumferential surface is desirably coated with a hard film of TiN, TiCN, TiAlN, DLC (Diamond-Like Carbon), etc. An oil hole opening in a flank at the tip is desirably helically disposed longitudinally through the drill in substantially parallel with the chip discharge flutes such that cutting fluid or air can be supplied to a cutting part as needed.

Although a first convex curve and a first concave curve intersect with each other at an intersection A, this means that tangents of the both curves intersect with each other at a predetermined angle instead of becoming identical at the intersection A as in when the tangents of the both curves come into contact with each other on circumscribed circles. Therefore, a protrusion is formed in a boundary portion of the both curves at the intersection A, and the protrusion can be rounded as needed.

Although a rake angle θ is negative at an outer circumferential point B in the fourth aspect of the invention, if the rake angle θ is negatively too large, cutting resistance and thrust resistance increase while the cutting edge becomes blunt and, therefore, the rake angle θ is suitably within a range of 0 degrees>θ≥−30 degrees, for example. In implementation of the other aspects of the invention, the rake angle θ may be 0 degrees or positive. The outer circumferential point B is a leading edge at which the chip discharge flute intersects with a margin.

Although the first convex curve, the first concave curve, a second concave curve, and a second convex curve are formed with predetermined curvature radii R1, R2, R3, and R4, respectively, and the concave curves and the convex curves are defined as circular arcs having respective constant radii in the seventh aspect of the invention, the curvature may continuously change within the ranges of these curvature radii R1, R2, R3, and R4. For example, the concave curves and the convex curves may be defined as circular arcs having respective constant radii in a transverse section of the chip discharge flute (a cross section perpendicular to the longitudinal direction of the flute) while the arcs deform depending on a helix angle in an axial perpendicular cross section. The first concave curve, the second concave curve, and the second convex curve are desirably smoothly connected (tangentially connected) with each other.

EXAMPLE

An example of the present invention will now be described in detail with reference to the drawings.

Figure 2:
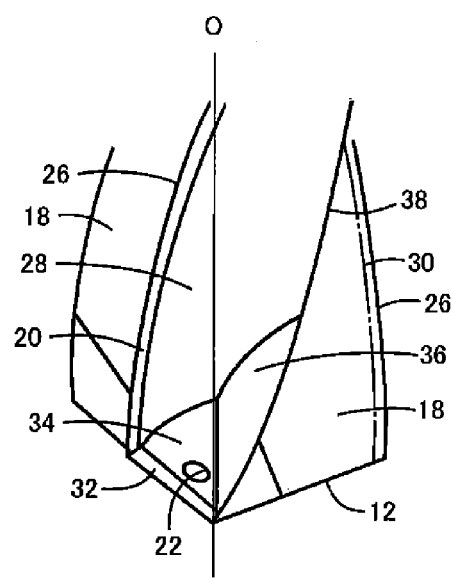
FIG. 2 is an enlarged view of a tip portion of the three-flute drill of FIG. 1.
Figure 3:
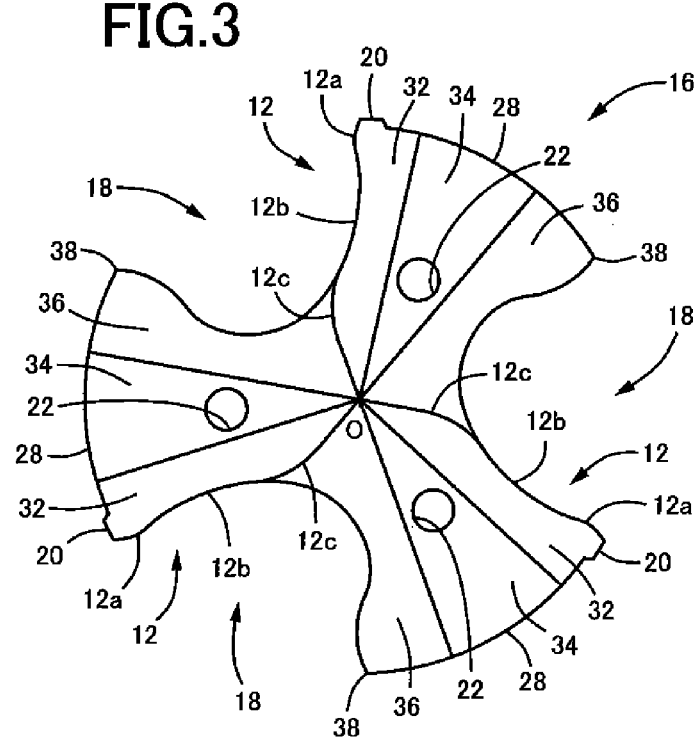
FIG. 3 is an enlarged view of a tip surface when the three-flute drill of FIG. 1 is viewed from the tip side.
Figure 4:
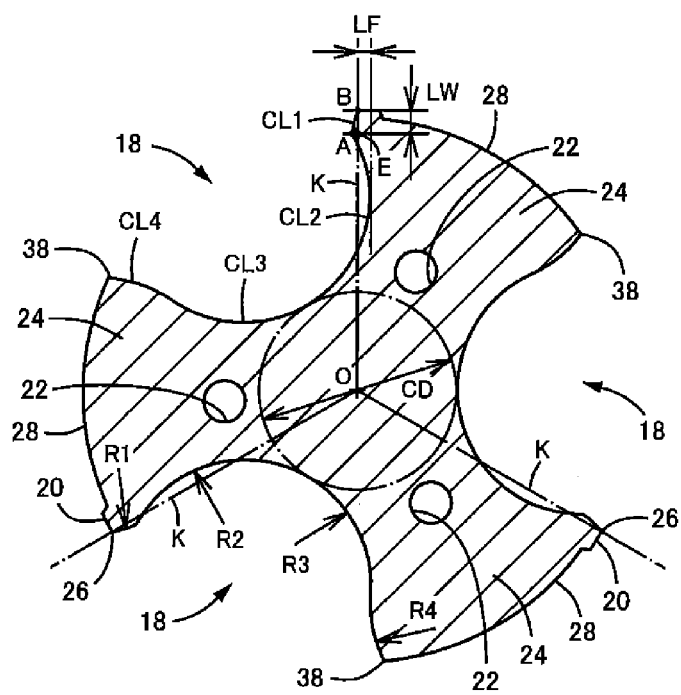
FIG. 4 is a diagram of an axially perpendicular cross-sectional view orthogonal to the axial center O of the three-flute drill of FIG. 1 and is an enlarged view taken along IV-IV of FIG. 1.

FIG. 1 is a conceptual diagram of a three-flute drill 10 (hereinafter simply referred to as a drill 10) that is an example of the present invention and is a front view from a direction perpendicular to an axial center O. FIG. 2 is an enlarged view of a tip portion disposed with a cutting edge 12 of the drill 10. FIG. 3 is an enlarged view of a tip surface when the drill 10 is viewed from the tip side. FIG. 4 is a diagram of an axial perpendicular cross section orthogonal to the axial center O and is an enlarged view taken along IV-IV of FIG. 1.

The drill 10 is a three-flute twist drill and axially concentrically and integrally includes a shank portion 14 and a flute portion 16. The flute portion 16 has three chip discharge flutes 18 twisted clockwise around the axial center O at a predetermined helix angle (e.g., about 30 degrees) and margins 20 are disposed along the chip discharge flutes 18. The chip discharge flutes 18 are opened in a C-shape in a tapered tip portion of the drill 10 and respective cutting edges 12 are disposed on opening edges of the chip discharge flutes 18 on the side toward the rotation direction of the drill 10 (counterclockwise direction of FIG. 3). The drill 10 is made of cemented carbide, and surfaces are coated with a hard film of TiAlN alloy at a tip portion disposed with the cutting edges 12 etc. and in the flute portion 16 disposed with the chip discharge flutes 18 including inner wall surfaces of the chip discharge flutes 18.

The margin 20 is disposed along a leading edge 26 that is an end edge of a land 24 separated by the chip discharge flutes 18 on the front side in the drill rotation direction. An outer circumferential surface of the drill 10 is made up of an outer circumferential surface of the margin 20, and a relieving surface 28 disposed with a constant radial dimension after the margin 20. The outer diameter of the margin 20 is substantially the same dimension as a drill cutting diameter (outer diameter of the cutting edges 12) D at the tip portion of the drill 10 and is gradually reduced to a smaller diameter from the tip portion of the drill 10 toward the shank portion 14 through a predetermined back taper.

The cutting edge 12 is made up of a convexly-curved cutting edge portion 12a formed on an outer circumferential side portion and a concavely-curved cutting edge portion 12b formed on an inner circumferential side portion in a tip opening portion of the chip discharge flute 18. A tapered tip surface of the drill 10 has a first flank 32 and a second flank 34 on the rear side of each of the three cutting edges 12 in the rotation direction. The second flank 34 has an oil hole 22 helically disposed longitudinally through the drill 10 in substantially parallel with the chip discharge flutes 18 and opened such that cutting fluid or air can be supplied to a cutting part as needed. An axial-center-side portion, i.e., a web thickness portion, of the cutting edge 12 is subjected to R-type thinning and an R-shaped axial-center-side cutting edge portion 12c smoothly curved on the bottom view of FIG. 3 is disposed and smoothly connected to the concavely-curved cutting edge portion 12b.

Figures 5, 6:
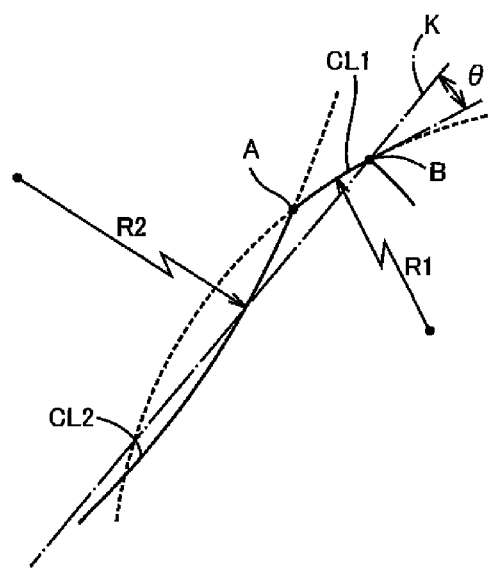
FIG. 5 is an enlarged view for explaining details of a connecting shape between the first convex curve and the first concave curve on a side of a leading edge in the axially perpendicular cross-sectional view of FIG. 4.
FIG. 6 exemplarily depicts the quality of work materials that can be drilled by using the three-flute drill of the example of FIG. 1.

The chip discharge flute 18 is cut by using a plurality of types of fluting grindstones and has an asymmetrical flute cross-sectional shape. In the axial perpendicular cross section perpendicular to the axial center O depicted in FIG. 4, the inner wall surface of the chip discharge flute 18 is C-shaped, and the inner wall surface on the side toward the drill rotation direction (a side of the leading edge 26) is made up of a first convex curve CL1 corresponding to the convexly-curved cutting edge portion 12a and having a constant curvature radius R1 and a first concave curve CL2 corresponding to the concavely-curved cutting edge portion 12b and having a constant curvature radius R2 intersecting with each other. FIG. 5 is an enlarged view for explaining details of a connecting shape between the first convex curve CL1 and the first concave curve CL2, and the arcs of the both curvature radii R1 and R2 intersect with each other at an intersection A at a predetermined intersection angle. As depicted in FIG. 4, in the inner wall surface of the chip discharge flute 18, an inner wall surface facing opposite to the drill rotation direction (on the side of a heel 38) is made up of a second concave curve CL3 having a constant curvature radius R3 and smoothly connected to the first concave curve CL2 and a second convex curve CL4 having a constant curvature radius R4 and smoothly connected to the second concave curve CL3. In this example, since the first convex curve CL1 corresponding to the convexly-curved cutting edge portion 12a is a convex surface having the curvature radius R1 projecting in the rotation direction, the strength against cracking of an outer circumferential corner portion (portion connected to the leading edge 26) of the cutting edge 12 is further increased as compared to when a flat chamfer is simply disposed.

Figure 15:
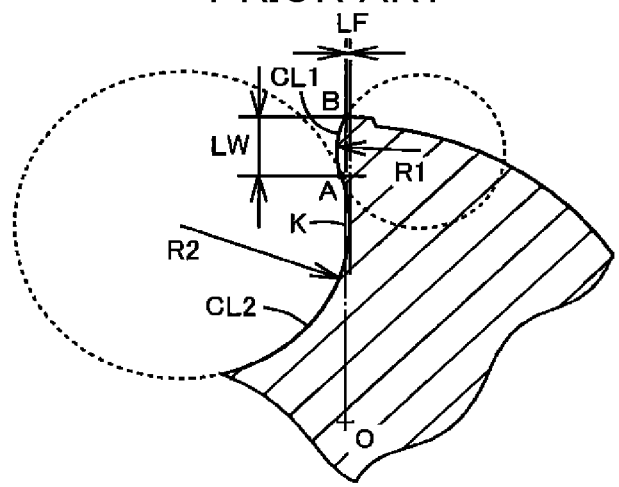
FIG. 15 is an axial perpendicular cross-sectional diagram for explaining a flute cross-sectional shape of the comparison product used in the cutting test 2.

As depicted in FIG. 5, since the first convex curve CL1 and the first concave curve CL2 intersect with each other, a slight protrusion ridgeline 30 is formed in a boundary portion of the both curves indicated by the intersection A as depicted by a dashed-dotted line in FIG. 2. Since chips generated from the cutting edge 12 are curled along the arc-shaped inner wall surface made up of the first concave curve CL2, the intersection A is desirably positioned closer to the outer circumference as far as possible so as to acquire chips in a curled shape with a shorter overall length. Since the drill 10 of this example has the first convex curve CL1 corresponding to the convexly-curved cutting edge portion 12a on the outer circumferential side and the first concave curve CL2 corresponding to the concavely-curved cutting edge portion 12b on the inner circumferential side intersecting with each other as described above, the intersection A, i.e., a connection point between the first convex curve CL1 and the first concave curve CL2, is preferably positioned closer to the outer circumference as compared to when the tangents of the first convex curve CL1 and the first concave curve CL2 coincide with each other at the intersection A, or in other words, when the curves are smoothly connected such that the arcs thereof come into contact with each other as circumscribed circles at the intersection A (see FIG. 15).

In the axially perpendicular cross-sectional view of FIG. 4, the drill 10 of this example has a concave amount LF of the first concave curve CL2 set within a range of 0.01D to 0.05D (where D is the drill cutting diameter) relative to a reference line K connecting an outer circumferential point B, at which the outer circumferential surface of the drill 10 intersects with the first convex curve CL1, and the axial center O defined as a drill center point. Since the chips are generated by the concavely-curved cutting edge portion 12b corresponding to the first concave curve CL2 having the concave amount LF within the range and the inner wall surface made up of the first concave curve CL2 and are formed into a preferred curled shape with a relatively shorter overall length and preferably discharged through the chip discharge flute 18 to suppress clogging of chips, durability performance of the drill 10 is enhanced and a thrust load during cutting is reduced.

In the axially perpendicular cross-sectional view of FIG. 4, the drill 10 of this example has a rake chamfer width LW set within a range of 0.005D to 0.06D (where D is a drill cutting diameter) as a radial distance from an intersection E between a straight line orthogonal to the reference line K, which passes through the intersection A of the first convex curve CL1 and the first concave curve CL2, and the reference line K, to the outer circumferential point B. Since the radial dimension of the first convex curve CL1 is preferably made smaller, the chip shape is a curled shape with a relatively shorter overall length and a needle-like projection is made smaller.

In the axially perpendicular cross-sectional view of FIG. 4, the drill 10 of this example has a rake angle θ (see FIG. 5), i.e., an angle between the reference line K and the first convex curve CL1 at the outer circumferential point B, set to be negative so that the strength of an outer circumferential corner portion of the cutting edge 12 corresponding to the vicinity of the outer circumferential point B is enhanced. In this example, the rake angle θ is within a range of 0 degrees>θ≥−30 degrees and is about −20 degrees, for example. The drill 10 of this example has a web thickness CD set to 0.15D to 0.50D (where D is a drill cutting diameter) so that the cross-sectional area of the chip discharge flute 18 is increased as much as possible while transverse strength is ensured. The web thickness CD is a web thickness (flute bottom diameter) in the drill tip portion and, although the web thickness may be axially constant, a taper can be disposed such that the diameter increases or decreases toward the shank portion 14.

In the axially perpendicular cross-sectional view of FIG. 4, the drill 10 of this example has the inner wall surface of the chip discharge flute 18 facing opposite to the rotation direction and made up of the second concave curve CL3 formed on the inner circumferential side and the second convex curve CL4 formed continuously on the outer circumferential side to be smoothly connected to the second concave curve CL3, and the second convex curve CL4 is disposed to reach the heel 38 of the land 24. The second convex curve CL4 reinforces the heel 38 portion of the land 24.

In the axially perpendicular cross-sectional view of FIG. 4, the drill 10 of this example has the curvature radius R1 of the first convex curve CL1, the curvature radius R2 of the first concave curve CL2, the curvature radius R3 of the second concave curve CL3, and the curvature radius R4 of the second convex curve CL4 set within ranges of R1: 0.02D to 0.4D, R2: 0.10D to 0.45D, R3: 0.10D to 0.45D, and R4: 0.3D to 1.2D, to define arcs with respective constant radii. A relationship between the curvature radius R2 of the first concave curve CL2 and the curvature radius R3 of the second concave curve CL3 is set within a range of $0.5 \leq R3/R2 \leq 1.1$.

FIG. 6 exemplarily depicts the quality of work materials that can be drilled by using the drill 10 of this example. A "double-circle" mark indicates a material most suitable for the hole drilling by the drill 10. A "single-circle" mark indicates a material suitable for the hole drilling by the drill 10. Applied conditions are cutting speed: 30 to 200 (m/min) and feed rate per rotation: 0.01D to 0.2D (mm/rev).

<Cutting Test 1>

Figures 7, 8:
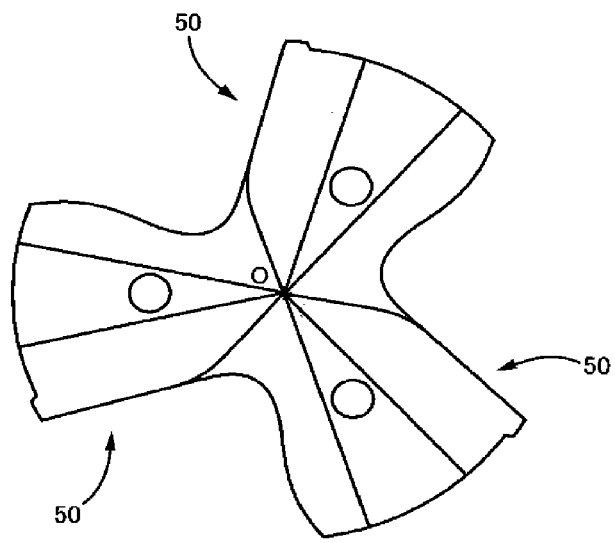
FIG. 7 is a diagram of curvature radii of portions of flute cross-sectional shapes of an inventive product and a comparison product used in a cutting test 1 for comparison.
FIG. 8 is a diagram of a tip surface shape of the comparison product (straight cutting edge drill) used in the cutting test 1.

A cutting test 1 performed by the present inventors will be described. As depicted in FIG. 7, the cutting test 1 was performed by using a hooked cutting edge drill corresponding to the drill 10 of the inventive product and a straight cutting edge drill (comparison product) having cutting edges formed straight for the hole drilling under the following cutting test conditions. The straight cutting edge drill has a cutting edge 50 forming a substantially linear shape in an opening portion of a chip discharge flute in a tip surface view as depicted in FIG. 8.

Figure 9:
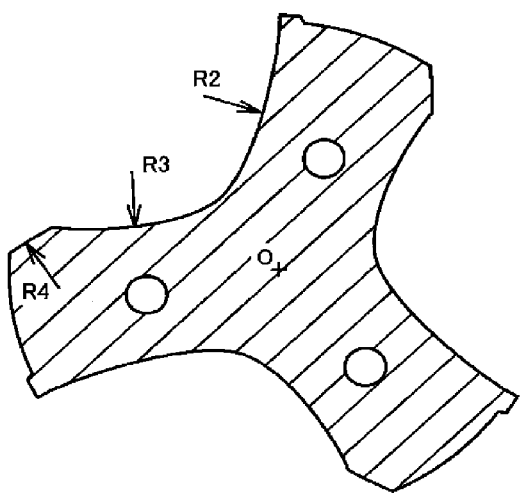
FIG. 9 is an axial perpendicular cross-sectional diagram of a cross-sectional shape of the comparison product used in the cutting test 1.

<Hooked Cutting Edge Drill> tool material: cemented carbide; overall length: 106 mm; flute length: 50 mm; drill cutting diameter: 10 mm; point angle: 140 degrees; shape of chip discharge flute: R1=0.13D, R2=0.28D, R3=0.23D, and R4=0.62D; concave amount LF: 0.23D; and rake chamfer width LW: 0.03D <Straight Cutting Edge Drill> tool material: cemented carbide; overall length: 106 mm; flute length: 50 mm; drill cutting diameter: 10 mm; point angle: 140 degrees; shape of chip discharge flute: R2=1.45D, R3=0.39D, and R4=0.46D; and drill shape: shape depicted in the tip surface view of FIG. 8 and a cross-sectional view of FIG. 9

Figure 10:
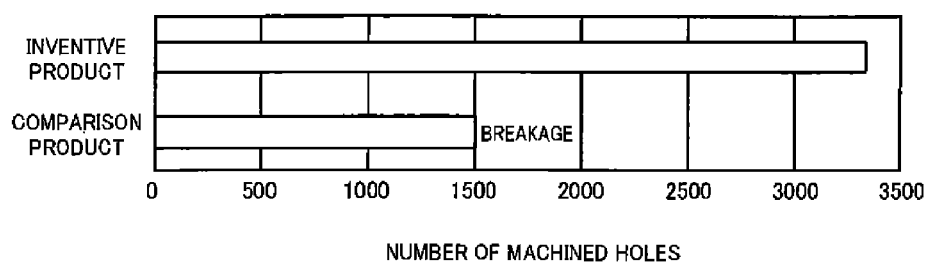
FIG. 10 is a diagram for explaining a test result of the cutting test 1.

<Machining Conditions> work material: S25C (carbon steel for machine structure defined by JIS); machining depth: 30 mm (blind hole); cutting speed: 63 m/min; feed rate: 0.4 mm/rev; step: none; cutting oil: water-soluble coolant (external oil feed); and coolant pressure: 3 MPa FIG. 10 depicts a test result of the cutting test 1, i.e., the numbers of machined holes that could be formed by hole drilling using the drills. In this result, the drill was broken at about 1500 holes in the hole drilling using the straight cutting edge drill of the comparison product, while 3000 or more holes could be drilled in the hole drilling using the hooked cutting edge drill of the inventive product and the tool life was doubled or longer. FIG. 11 is a diagram (photograph) of a chip shape from the hooked cutting edge drill and FIG. 12 is a diagram (photograph) of a chip shape from the straight cutting edge drill. In FIGS. 11 and 12, the chip shape from the straight cutting edge drill is less curled and has a needle-like projection, while the chip shape from the hooked cutting edge drill is further curled without formation of needle-like projection and is broken into smaller pieces with shorter overall length and, therefore, relatively higher chip discharge performance is considered to be achieved.

<Cutting Test 2>

A cutting test 2 was performed by using an inventive product having the first convex curve CL1 and the first concave curve CL2 intersecting with each other as in the drill 10 of the example as depicted in FIG. 13 and a comparison product having the first convex curve CL1 and the first concave curve CL2 smoothly connected to each other for the hole drilling under the following cutting test conditions.

Figure 14:
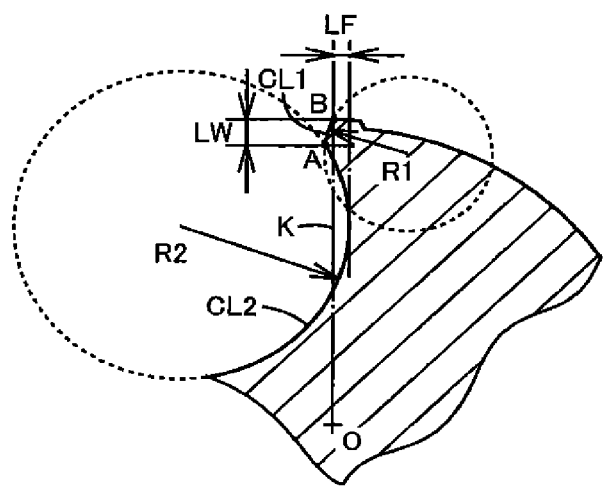
FIG. 14 is an axial perpendicular cross-sectional diagram for explaining a flute cross-sectional shape of the inventive product used in the cutting test 2.

<Inventive Product> tool material: cemented carbide; overall length: 140 mm; flute length: 90 mm; drill cutting diameter: 8 mm; point angle: 140 degrees; shape of chip discharge flute: R1=1.00 mm (0.125D) and R2=2.00 mm (0.25D); concave amount LF: 0.02D; rake chamfer width LW: 0.04D; and drill shape: the first convex curve CL1 and the first concave curve CL2 intersecting with each other as depicted in the cross-sectional view of FIG. 14

<Comparison Product> tool material: cemented carbide; overall length: 140 mm; flute length: 90 mm; drill cutting diameter: 8 mm; point angle: 140 degrees; shape of chip discharge flute: R1=1.00 mm (0.125D) and R2=2.00 mm (0.25D); concave amount LF: 0.003D; rake chamfer width LW: 0.10D; and drill shape: the first convex curve CL1 and the first concave curve CL2 smoothly connected to each other as depicted in the cross-sectional view of FIG. 15

Figure 16:
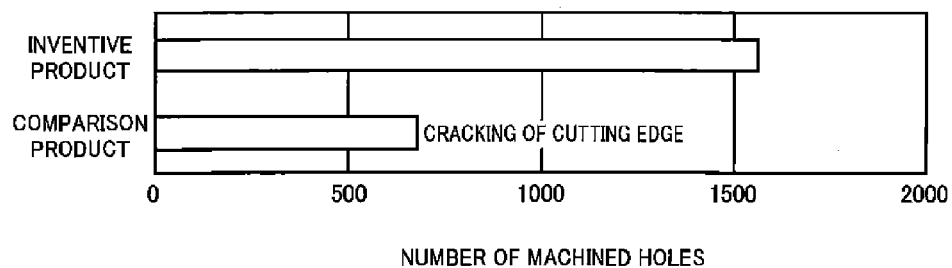
FIG. 16 is a diagram for explaining a test result of the cutting test 2.
Figure 17:
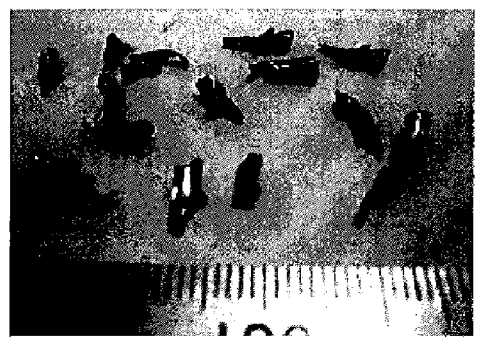
FIG. 17 is a photograph of a chip shape generated in the hole drilling using the inventive product in the cutting test 2.
Figure 18:
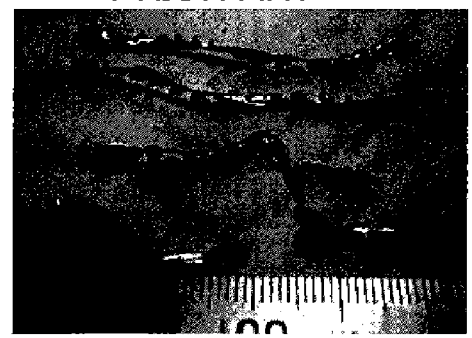
FIG. 18 is a photograph of a chip shape generated in the hole drilling using the comparison product in the cutting test 2.

<Machining Conditions> work material: SCM440 (chromium molybdenum steel defined by JIS); machining depth: 64 mm (through-hole); cutting speed: 80 m/min; feed rate: 0.28 mm/rev; step: none; cutting oil: water-soluble coolant (oil feed inside drill); and coolant pressure: 3 MPa FIG. 16 depicts a test result of the cutting test 2, i.e., the numbers of machined holes that could be formed by hole drilling using the drills. In this result, the machining became impossible due to cracking of the cutting edge at about 700 holes in the hole drilling using the comparison product, while 1500 or more holes could be drilled in the hole drilling using the inventive product and the tool life was doubled or longer. FIG. 17 is a diagram (photograph) of a chip shape from the inventive product and FIG. 18 is a diagram (photograph) of a chip shape from the comparison product. Comparing these chip shapes, although both are curled in the same manner, the chip shape from the inventive product is not provided with a needle-like projection and is broken into smaller pieces with shorter overall length, while the chip shape from the comparison product is formed with a needle-like projection and has relatively longer overall length and are therefore estimated to have relatively lower discharge performance and easily cause clogging of chips, which is considered as a cause of deterioration in durability.

<Cutting Test 3>

Twelve types of test products No. 1 to No. 12 having different flute cross-sectional shapes of the chip discharge flutes were prepared as depicted in FIG. 19 and the test products No. 1 to No. 12 were used for the hole drilling under the following cutting test conditions. The test products No. 1 to No. 3 are preferred products satisfying all the ranges defined in claims 2, 3, 5, 7, and 8, and the test products No. 4 to No. 12 have items with numerical values surrounded by rectangles out of the ranges defined in claims 2, 3, 5, 7, and 8. A minus sign "−" in a field of the concave amount LF of FIG. 19 means that the maximum concave point of the first concave curve CL2 is projected from the reference line K.

Figure 21:
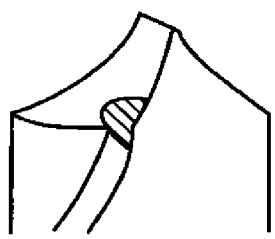
FIG. 21 is a diagram for specifically explaining a corner portion crack in the test result of the cutting test 3.
Figure 22:
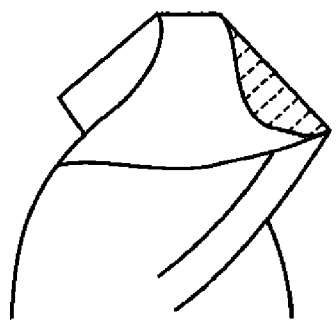
FIG. 22 is a diagram for specifically explaining wear in the test result of the cutting test 3.
Figure 23:
FIG. 23 is a diagram for specifically explaining the breakage of the drill in the test result of the cutting test 3.

<Test Product> tool material: cemented carbide; overall length: 190 mm; flute length: 130 mm; drill cutting diameter: 10 mm; and point angle: 140 degrees <Machining Conditions> work material: SS400 (rolled steel for general structure defined by JIS); machining depth: 100 mm (through-hole); cutting speed: 100 m/min; feed rate: 0.45 mm/rev; step: none; cutting oil: water-soluble coolant (oil feed inside drill); and coolant pressure: 3 MPa FIG. 20 depicts results of the study of chip shapes, thrust loads, and durability of the test products No. 1 to No. 12. In FIG. 20, a "circle" mark indicates an excellent result and a "triangle" mark indicates a less favorable result as compared to the "circle" mark, while a "cross" mark indicates an unfavorable result. A "corner portion crack" in a field of durability performance of FIG. 20 means that the cracking of the outer circumferential corner portion of the cutting edge 12 depicted in FIG. 21 causes the end of life; "significant wear" means that the flank wear of the cutting edge 12 depicted in FIG. 22 exceeding an allowable limit causes the end of life; and "breakage" means that the breakage of the drill depicted in FIG. 23 causes the end of life. FIGS. 21 to 23 are described in "ITS B 0171" and depict exemplification of two-flute drills.

As apparent from the test results of FIG. 20, the test products No. 1 to No. 3 produced excellent results in the chip shape, the thrust load, and the durability performance. In other words, chips were acquired in a curled shape having a shorter overall length without a needle-like projection as depicted in, for example, FIGS. 11 and 17 with good discharge property, and the thrust load for feeding the drills in the axial center O direction was relatively small at the feed rate of 0.45 mm/rev while the hole drilling could be performed for a predetermined number or more of holes. On the other hand, the test products No. 4 to No. 12 produced less favorable results indicated by "triangle" marks or unfavorable results indicated by "cross" marks in at least one of the chip shape and the thrust load and had one of the drill breakage, the corner portion crack, and the significant wear in terms of durability performance evaluation.

The configurations of the test products No. 4 to No. 12 with the durability performance evaluation of "triangle" or "cross" lead to the following analysis. First, the breakage of the test product No. 4 and the test product No. 11 due to clogging of chips is considered to be attributable to reduction in discharge property derived from an excessively small cross-sectional area of the chip discharge flutes 18. In other words, it is estimated that the test product No. 4 has a radius ratio R3/R2 set to an excessively small value of 0.42, which makes the curvature radius R3 relatively smaller as compared to the curvature radius R2, and therefore has an excessively small cross-sectional area of the chip discharge flutes 18, and that the test product No. 11 has an excessively large web thickness CD of 0.52D and a negative value of −0.01D as the concave amount LF of the first concave curve CL2 with the curvature radius R2 and therefore has an excessively small cross-sectional area of the chip discharge flutes 18.

The breakage of the test product No. 5 and the test product No. 10 due to tool rigidity shortage is considered to be attributable to an insufficient drill cross-sectional area. In other words, it is estimated that the test product No. 5 has the radius ratio R3/R2 set to an excessively large value of 1.15, which makes the curvature radius R3 relatively larger as compared to the curvature radius R2, and therefore has an excessively small cross-sectional area of the drill, and that the test product No. 10 has the web thickness CD set to an excessively small value of 0.13D and therefore has an excessively small cross-sectional area of the drill.

The corner portion crack of the test products No. 6 to No. 8 and No. 12 is considered to be attributable to the strength or rigidity shortage of the outer circumferential corner portion of the cutting edge 12. In other words, it is considered that the test product No. 6 has the rake chamfer width LW set to an excessively small value of 0.003D and the curvature radius R1 of the first convex curve CL1 set to an excessively small value of 0.018D and therefore cannot sufficiently achieve the strength of the corner portion. It is considered that the test product No. 7 has the radius ratio R3/R2 set to an excessively large value of 1.62, or in other words, the curvature radius R2 set to a relatively small value, and the concave amount LF of the first concave curve CL2 with the curvature radius R2 set to an excessively large value of 0.06D and therefore cannot sufficiently achieve the strength of the corner portion. It is considered that the test product No. 8 has the curvature radius R1 of the first convex curve CL1 set to an excessively large value of 0.42D, which makes the convexly-curved cutting edge portion 12a corresponding to the first convex curve CL1 close to a straight line because of a smaller swelling-out amount in the rotation direction, and therefore cannot sufficiently achieve the strength of the convexly-curved cutting edge portion 12a, i.e., the strength of the corner portion. It is considered that the test product No. 12 has the curvature radius R2 set to an excessively small value of 0.09D and the concave amount LF of the first concave curve CL2 with the curvature radius R2 set to an excessively large value of 0.06D and therefore tends to crack in the corner portion.

The significant wear of the test product No. 9 is considered to be attributable to a lower cutting efficiency increasing a thrust load for maintaining a predetermined feed rate (0.45 mm/rev). In other words, it is considered that since the test product No. 9 has the concave amount LF of the first concave curve CL2 with the curvature radius R2 set to a negative value of −0.01D, the radius ratio R3/R2 set to an excessively small value of 0.4, which makes the curvature radius R2 about twice larger relative to the curvature radius R3, the curvature radius R2 set to a large value of 0.52D, and the rake chamfer width LW set to an excessively large value of 0.09D, the cutting edge 12 having the large curvature radius R2 on the rotation direction side relative to the reference line K becomes blunt and has a relatively smaller cutting amount, accordingly increasing the thrust load.

Considering each of the excessively large values or the excessively small values estimated as the causes of the lack of sufficient durability performance of the test products No. 4 to No. 12, it is desirable that the concave amount LF of the first concave curve CL2 is within a range of 0.01D to 0.05D, that the rake chamfer width LW is within a range of 0.005D to 0.06D, that the web thickness CD is within a range of 0.15D to 0.50D, that the curvature radius R1 of the first convex curve CL1 is within a range of 0.02D to 0.4D, that the curvature radius R2 of the first concave curve CL2 is within a range of 0.10D to 0.45D, and that the curvature radius ratio R3/R2 between the first concave curve CL2 and the second concave curve CL3 is within a range of 0.5 to 1.1.

As described above, according to the drill 10 of this example, since each of the three cutting edges 12 at the tip has the convexly-curved cutting edge portion 12a on the outer circumferential side and the concavely-curved cutting edge portion 12b on the inner circumferential side and the axial perpendicular cross section orthogonal to the axial center O has the first convex curve CL1 corresponding to the convexly-curved cutting edge portion 12a and the first concave curve CL2 corresponding to the concavely-curved cutting edge portion 12b intersecting with each other at the intersection A, the range of the first convex curve CL1, i.e., the convexly-curved cutting edge portion 12a, can be made smaller and the first concave curve CL2, i.e., the concavely-curved cutting edge portion 12b, can be expanded and disposed on the outer circumferential side, and the concave amount LF of the first concave curve CL2 can be made larger. As a result, since chips generated from the cutting edge 12 are properly curled and easily broken in the first concave curve CL2 portion of the chip discharge flute 18 and are formed into a relatively short curled shape having no needle-like projection and, therefore, the chips are smoothly discharged with enhanced discharge performance, the clogging of the chips is suppressed and the tool life is further improved even in the three-flute drill 10 having relatively smaller flute width and cross-sectional area of the chip discharge flutes 18.

According to the drill 10 of this example, since the axial perpendicular cross section orthogonal to the axial center O has the concave amount LF of the first concave curve CL2 set within a range of 0.01D to 0.05D relative to the reference line K connecting the outer circumferential point B, at which the drill outer circumferential portion intersects with the first convex curve CL1, and the axial center O defined as the drill center point, the chips are properly curled and broken into pieces having a curled shape with a relatively shorter overall length and are further smoothly discharged to suppress the clogging of the chips, and the durability performance is enhanced while the thrust load during hole drilling is reduced. If the concave amount LF of the first concave curve CL2 becomes less than 0.01D, the flank wear width of the drill 10 increases and the durability performance deteriorates and, if the concave amount LF exceeds 0.05D, the outer circumferential corner portion of the cutting edge 12 easily cracks.

According to the drill 10 of this example, since the axially perpendicular cross section has the small rake chamfer width LW within a range of 0.005D to 0.06D, the chips are properly curled and easily broken in the first concave curve CL2 portion into pieces having a curled shape with a relatively shorter overall length and are further smoothly discharged to suppress the clogging of the chips, and the durability performance is enhanced while the thrust load during hole drilling is reduced. If the rake chamfer width LW becomes less than 0.005D, the outer circumferential corner portion of the cutting edges 12 easily cracks and, if the rake chamfer width LW exceeds 0.06D, the flank wear width increases and the durability performance deteriorates.

According to the drill 10 of this example, since the rake angle θ at the outer circumferential point B is negative, the outer circumferential corner portion of the cutting edge 12 corresponding to the outer circumferential point B is enhanced in strength and prevented from cracking, and the durability performance of the drill 10 is enhanced.

Since the drill 10 of this example has the web thickness CD within a range of 0.15D to 0.50D, the chip discharge performance and the transverse strength of the drill 10 are properly secured and the durability performance of the drill 10 is further enhanced. If the web thickness CD becomes less than 0.15D, the transverse strength is reduced and the drill 10 is easily broken and, if exceeding 0.50D, the chip discharge performance deteriorates and the drill 10 is easily broken due to clogging of chips.

According to the drill 10 of this example, since the inner wall surface facing opposite to the drill rotation direction in the axial perpendicular cross section is made up of the second concave curve CL3 on the inner circumferential side and the second convex curve CL4 on the outer circumferential side, chips are smoothly discharged through the chip discharge flute 18 to suppress the clogging of chips, and the durability performance is enhanced while the thrust load during hole drilling is reduced. Because of the second convex curve CL4 reaching the heel 38, and also because of the first convex curve CL1 on the leading edge 26 side, the opening end edges of the C-shaped or U-shaped cross section of the chip discharge flute 18, i.e., the corner portions making up the leading edge 26 and the heel 38 are reinforced by the first convex curve CL1 and the second convex curve CL4, respectively, to prevent the corner portions from cracking and enhance the durability of the drill 10.

When the drill 10 of this example has the first convex curve CL1 with the curvature radius of R1, the first concave curve CL2 with the curvature radius of R2, the second concave curve CL3 with the curvature radius of R3, and the second convex curve CL4 with the curvature radius of R4, since the curvature radii R1, R2, R3, and R4 are within the ranges of 0.02D to 0.4D, 0.10D to 0.45D, 0.10D to 0.45D, and 0.3D to 1.2D, respectively, the chips are properly curled and broken into pieces having a curled shape with a relatively shorter overall length and are smoothly discharged through the chip discharge flute 18 to suppress the clogging of chips, and the durability performance is enhanced while the thrust load during hole drilling is reduced. If the curvature radius R1 becomes less than 0.02D or exceeds 0.4D, the outer circumferential corner of the cutting edge 12 easily cracks. If the curvature radius R2 becomes less than 0.10D, the outer circumferential corner of the cutting edge 12 easily cracks and, if exceeding 0.45D, the thrust load increases and the wear becomes significant.

Since the drill 10 of this example has the radius ratio R3/R2 of the curvature radius R3 to R2 within a range of 0.5 to 1.1, the cross-sectional area of the chip discharge flute 18 can be made larger within a range in which the rigidity of the drill 10 is ensured, so as to improve the chip discharge performance. If the radius ratio R3/R2 becomes less than 0.5, the cross-sectional area of the chip discharge flute 18 becomes too small and the clogging of chips easily occurs and, if exceeding 1.1, the cross-sectional area of the drill 10 becomes too small and reduces the rigidity, and the drill is easily broken.

Although the example of the present invention has been described in detail with reference to the drawings, the present invention is applied in other forms.

For example, although the first convex curve CL1 and the first concave curve CL2 intersecting at the intersection A are arcs having the constant curvature radii R1 and R2 in the drill 10 of the example, the curves may not necessarily be arcs with constant radii.

Although the flute portion 16 of the drill 10 of this example is provided with the chip discharge flutes 18 twisted clockwise around the axial center O at the predetermined helix angle (e.g., about 30 degrees), the present invention is applicable to various three-flute drills such as a twist drill having the chip discharge flutes 18 twisted anticlockwise around the axial center O, a straight cutting edge drill having the chip discharge flutes 18 parallel to the axial center O, and a double margin drill disposed with two margins per land.

Although the drill 10 of this example is disposed with the three oil holes 22 longitudinally passing therethrough in the axial center O direction, the oil holes 22 may be disposed as needed depending on quality etc., of work material. The margin 20 may not necessarily be disposed.

Although in the cross section orthogonal to the axial center O, the inner wall surface facing opposite to the rotation direction in the inner wall surface of the chip discharge flute 18 of the drill 10 of this example is made up of the second concave curve CL3 formed on the inner circumferential side and the second convex curve CL4 formed continuously from the second concave curve CL3 on the outer circumferential side, and the second convex curve CL4 is set to reach the heel 38 of the land 24, the second convex curve CL4 is for the purpose of reinforcing the heel 38 of the land 24 and therefore may not necessarily be curved or may be removed as needed depending on material. Since the second concave curve CL3 is a portion less involved with the formation of curling of chips and may be provided to the extent that a gap from a chip is formed, the curvature radius R3 may be changed within a range not affecting the curling of chips and the discharge of chips.

Although the example of the present invention has been described in detail with reference to the drawings, this is merely an embodiment and the present invention may be implemented in variously modified and improved forms based on the knowledge of those skilled in the art.

NOMENCLATURE OF ELEMENTS

10: three-flute drill 12: cutting edge 12a: convexly-curved cutting edge portion 12b: concavely-curved cutting edge portion 18: chip discharge flutes 32: first flank 38: heel CL1: first convex curve CL2: first concave curve CL3: second concave curve CL4: second convex curve O: axial center A: intersection B: outer circumferential point LF: concave amount of the first concave curve LW: rake chamfer width K: reference line θ: rake angle R1, R2, R3, R4: curvature radius

The invention claimed is:

1. A three-flute drill comprising:
three chip discharge flutes axially disposed to open in a tip portion; and
three cutting edges each formed at an intersecting portion between an inner wall surface of each of the chip discharge flutes facing in a drill rotation direction during hole drilling and a tip flank formed on the tip portion,
the cutting edge having a concavely-curved cutting edge portion in a concavely-curved shape formed on an inner circumferential side and a convexly-curved cutting edge portion in a convexly-curved shape formed on an outer circumferential side,
an axially perpendicular cross-sectional view orthogonal to an axial center O having a first convex curve corresponding to the convexly-curved cutting edge portion and a first concave curve corresponding to the concavely-curved cutting edge portion intersecting with each other at an intersection A,
in the axially perpendicular cross-sectional view, a concave amount LF of the first concave curve being within a range of 0.01D to 0.05D in terms of a drill cutting diameter D relative to a reference line K connecting an outer circumferential point B, at which a drill outer circumferential portion intersects with the first convex curve, and the axial center O, and
in the axially perpendicular cross-sectional view, a rake chamfer width LW being a distance from an intersection E to the outer circumferential point B, wherein the intersection E is an intersection between the reference line K and a straight line passing through the intersection A and orthogonal to the reference line K, and
the rake chamfer width LW being within a range of 0.005D to 0.06D in terms of the drill cutting diameter D.

2. The three-flute drill of claim 1, wherein
in the axially perpendicular cross-sectional view, a rake angle θ is an angle between the reference line K and the first convex curve at the outer circumferential point B and is negative.

3. The three-flute drill of claim 1, wherein
the three-flute drill has a web thickness CD within a range of 0.15D to 0.50D in terms of the drill cutting diameter D.

4. The three-flute drill of claim 1, wherein
in the axially perpendicular cross-sectional view, an inner wall surface of the chip discharge flute facing opposite to the drill rotation direction during hole drilling is made up of a second concave curve formed on the inner circumferential side and a second convex curve formed continuously from the second concave curve on the outer circumferential side, and wherein the second convex curve reaches a heel.

5. The three-flute drill of claim 4, wherein
when the three-flute drill has the first convex curve with a curvature radius of R1, the first concave curve with a curvature radius of R2, the second concave curve with a curvature radius of R3, and the second convex curve with a curvature radius of R4 in the axially perpendicular cross-sectional view, the curvature radii R1 to R4 are within ranges of the following equations (1) to (4), respectively, in terms of the drill cutting diameter D:

$$R1: 0.02D \text{ to } 0.4D \tag{1};$$

$$R2: 0.10D \text{ to } 0.45D \tag{2};$$

$$R3: 0.10D \text{ to } 0.45D \tag{3); and}$$

$$R4: 0.3D \text{ to } 1.2D \tag{4}.$$

6. The three-flute drill of claim 5, wherein
a relationship between the curvature radius R2 of the first concave curve and the curvature radius R3 of the second concave curve satisfies the following equation (5):

$$0.5 \leq R3/R2 \leq 1.1 \tag{5}.$$

7. The three-flute drill of claim 1, wherein
a tangent of the first convex curve at the intersection A and a tangent of the first concave curve at the intersection A are non-parallel to each other.

* * * * *